INVENTOR.
ANTON M. ANDERSEN
BY
ATTORNEY

United States Patent Office

3,679,525
Patented July 25, 1972

---

3,679,525
APPARATUS FOR MOLDING FORMS ON VARIOUS SUBSTRATES
Anton M. Andersen, 1 Highland Ave., Demarest, N.J. 07627
Filed Feb. 3, 1970, Ser. No. 8,263
Int. Cl. B32b 31/04, 31/20
U.S. Cl. 156—515                                      6 Claims

ABSTRACT OF THE DISCLOSURE

Apparatus for molding forms on substrates so that the forms and substrates are a homogeneous unit and whereby the forms originate as shaped parts in the raw, semi-cured or fully cured state or as loads of form material in the raw state.

BACKGROUND OF THE INVENTION

Field of the invention

This invention relates to apparatus for applying forms of thermoplastic materials to flat or arched substrates of related or unrelated materials. In particular, the invention relates to apparatus of the type described which provides a homogeneous molded form and substrate. The forms may be of polymer or polymidic base and the substrate may be sheet metal, flat bar stock, supported and unsupported thermoplastic, absorbent and nonabsorbent fabrics such as synthetic yarns, cotton and wool yarns, glass fibers and flexible metal substrates such as closely woven metal wire mesh. The invention is useful for, but not limited to, applying forms to industrial process belting and attachments thereto.

Description of the prior art

Prior to the present invention flexible forms were applied to substrates by cementing a form of finished size and type on or in the substrate surface. Problems occurred due to the inadequacy of the bond and presizing and shaping of the forms was difficult and costly. Moreover, bonding is primarily a hand operation and is thus not economical. Apparatus employing closed, vented molds has been used to vulcanize the form to the substrate. This apparatus has not been satisfactory since proper pressure, amount of molding load and free controlled flow of material are not assured. Further, spewing or overflow of material requires costly finishing operations and curing has presented a problem since temperature variants which result when loading and unloading the mold do not assure adequate curing cycles and premature separation of the molded form from the substrate normally occurs.

SUMMARY OF THE INVENTION

This invention contemplates a frame having an interchangeable, split mold with a pair of heated, open faces mounted thereto. The frame carries a pressure plate disposed above the mold faces and a back-up pressure plate centered within the pressure plate and moving therewith. A heated bed is provided for supporting the substrate and the frame is initially in a raised position over the bed. The form material is loaded on previously prepared substrate and the frame is lowered to encompass the load. The mold faces are closed about the load and the pressure plate lowered to exert pressure thereupon, after which pressure is exerted on the back-up pressure plate, and which pressure is transferred to the center of the mold. Cycle time, pressure and temperature are predetermined in accordance with load material, size and state of cure.

One object of this invention is to apply a form to a substrate so that the form and substrae are a homogeneous unit.

Another object of this invention is to apply various forms to the substrate without using a cement or bonding agent.

Another object of this invention is to use split mold apparatus to accomplish the above, and whereby the adverse effect on curing occasioned by closed molds is minimized.

Another object of this invention is to avoid the necessity of preshaped and presized forms which are expensive and difficult to acquire within easily workable tolerances.

These and other objects and features of the invention will become more apparent from the following detailed description thereof with reference to the accompanying drawings.

DESCRIPTION OF THE DRAWINGS

In the drawings, wherein corresponding numerals indicate corresponding parts.

DESCRIPTION OF THE INVENTION

Figure 1:
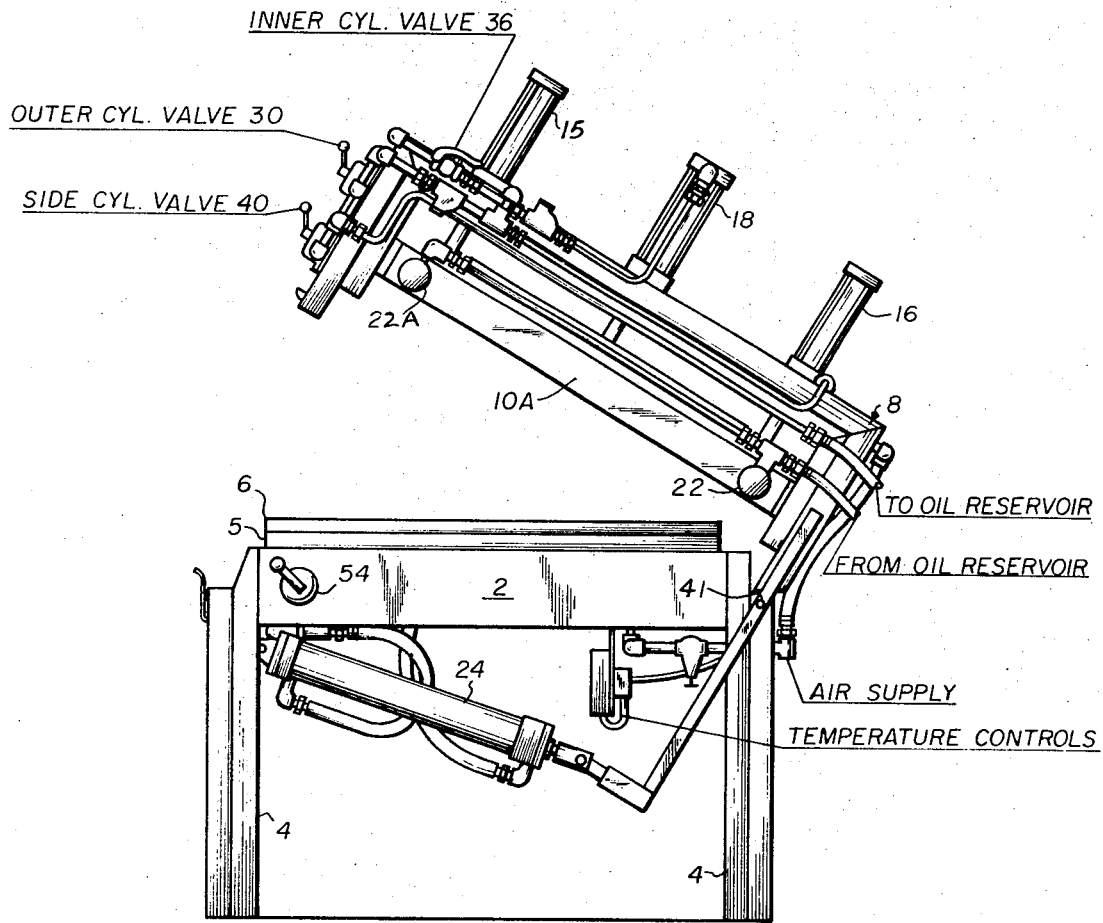
FIG. 1 is a right side view of the invention showing the frame thereof in the raised position.

FIG. 1 shows a bed frame 2 supported by legs 4, and which bed frame 2 supports a lower bed 5 and an upper bed 6. A frame 8 is supported at a point 41 in pivotal relation to beds 5 and 6 and is lowered and raised relative thereto. Frame 8 is shown in the raised position in FIG. 1.

Figure 2:
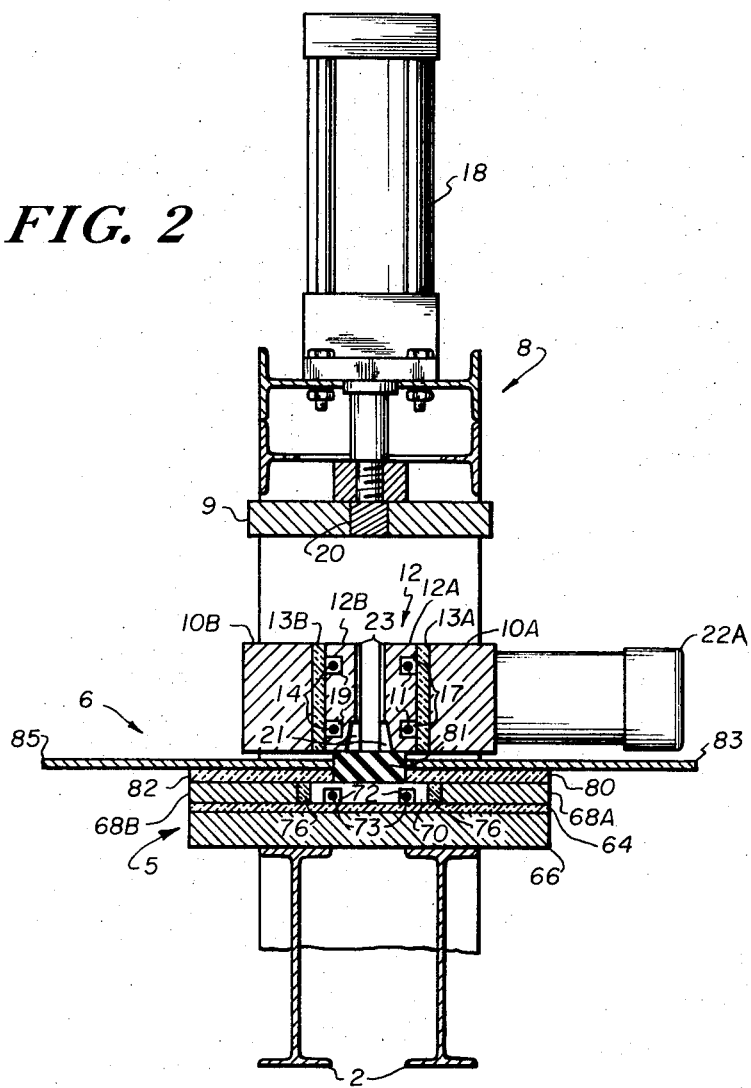
FIG. 2 is an end view of the invention showing the frame lowered, the mold faces open and the pressure plate centered within the lowered pressure plate.

With reference to FIG. 2, wherein frame 8 is shown in the lowered position, frame 8 has mounted thereto a pair of back-up plates 10A and 10B, and which back-up plates support mold faces 12A and 12B of a split mold 12. Mold 12 is shown open in FIG. 2. Frame 8 further supports a longitudinally movable pressure plate 9, shown in the raised position in the figure, and a back-up pressure plate 20 is centered in pressure plate 9 and moves therewith.

Referring again to FIG. 1, frame 8 supports a pair of outer hydraulic pressure cylinders 14 and 16, an inner hydraulic pressure cylinder 18 and a pair of side hydraulic pressure cylinders 22 and 22A. Bed frame 2 and legs 4 support a pneumatic pressure cylinder 24. It is to be noted that pressure cylinders 15, 16, 18, 22 and 22A may be pneumatic as well as hydraulic pressure cylinders and are herein referred to as hydraulic cylinders for purposes of illustration only.

Outer cylinders 15 and 16 are coupled through suitable piping means and a valve 30 to a hydraulic fluid reservoir, inner cylinder 18 is coupled through suitable piping means and a valve 36 to the hydraulic fluid reservoir and side pressure cylinders 22 and 22A are connected through suitable piping and a valve 40 to the reservoir. Pneumatic cylinder 24 is coupled through suitable piping and a valve 54 to an air supply. Valve 36 is coupled to valve 30 and will not operate unless valve 30 is operated as will hereinafter be shown.

Pneumatic cylinder 24 is coupled by suitable linkage to frame 8. When valve 54 is opened, cylinder 24 pressurizes causing frame 8 to pivot to its lowered position shown in FIG. 2. When valve 54 is actuated to an opposite position, pressure is reversed and frame 8 pivots to its raised position (FIG. 1).

Outer cylinders 15 and 16 are coupled by suitable means to pressure plate 9. When valve 30 is opened the cylinders are pressurized causing plate 9 with back-up plate 20 to be displaced to its lowered position shown in FIG. 3. When valve 30 is actuated to an opposite position, pressure is reversed and plates 9 and 20 rise (FIG. 1).

Figure 3:
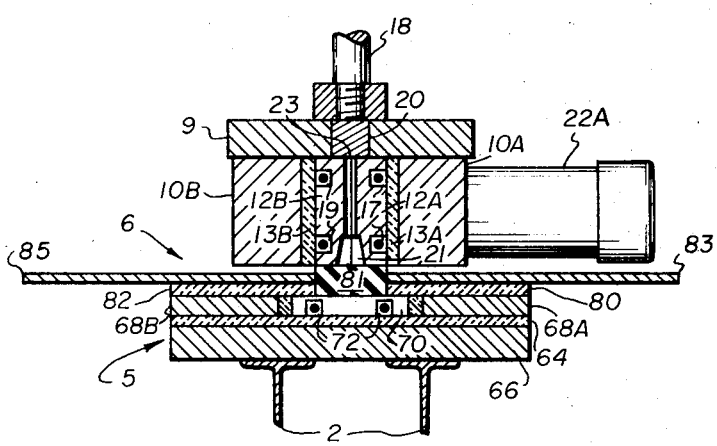
FIG. 3 is an end view showing the frame lowered, the mold closed, the pressure plate lowered and the back-up plate centered within the pressure plate.

Side cylinders 22 and 22A are coupled by suitable means to back-up plate 10A with the rams of the cylinders passing through plate 10A and being suitable coupled to plate 10B. When valve 40 is operated to pressurize the side cylinders, plates 10A and 10B are laterally displaced causing faces 12A and 12B of mold 12 mounted thereto to close (FIG. 3). When valve 40 is closed (FIG. 1) cylinders 22 and 22A are depressurized and mold faces 12A and 12B are forced apart by means of a spring return (not shown) mounted to both faces of the mold.

Inner cylinder 18 is coupled by suitable means to back-up pressure plate 20 centered in plate 9. When valve 30 is opened and pressure plate 9 is in the down position, valve 36 can be opened. When valve 36 is opened, cylinder 18 pressurizes causing a downward pressure to be exerted on plate 20 (FIG. 3), with the arrangement being such that the pressure is transferred to the center of the mold. The pressure exerted by back-up plate 20 is particularly required when a spacer is inserted between mold faces 12A and 12B for regulating the height of the form as will be hereinafter explained. When valve 36 is closed, cylinder 18 is depressurized and the downward pressure is relieved. plate 20 remains in position until valve 30 is reversed causing pressure plate 9 to raise carrying plate 20 with it.

With reference now to FIG. 2, it is seen that lower bed 5 includes, by way of example, but not by way of limitation, a base plate 66 of a metal such as aluminum and a sheet 64 of insulating material such as asbestos disposed on top of plate 66. Disposed on top of asbestos sheet 64 is a heater plate 70 having channels 72 and heating elements 73 embedded therein. The sides of heater plate 70 are lined with asbestos sheets 76. Spacer plates 68A and 68B are arranged contiguous to asbestos sheets 76. Heating elements 73 are coupled to suitable temperature control means suspended from bed frame 2 shown in FIG. 1.

Bed 6 includes a rubber bumper 81 of a suitable hardness and having a purpose as will be hereinafter described. Bumper 81 rests directly on heater plate 70 so as to be heated thereby. Asbestos sheets 80 and 82 are positioned on top of spacer plates 68A and 68B. Top plates 83 and 85 are positioned on top of asbestos sheets 80 and 82, respectively. Elements 80, 82, 83 and 85 cooperate to form a channel for bumper 81. Top plates 83 and 85 and asbestos sheets 80 and 82 are laterally adjustable to accommodate different size bumpers in accordance with the work being processed and to permit alignment of the bumper with respect to the mold.

With further reference to FIG. 2, it will be seen that when frame 8 is lowered, mold 12 rests on bumper 81 and initially the mold is open. Further, mold face 12A has channels 17 and heating elements 11 therein. Mold face 12A is separated from plate 10A by an asbestos sheet 13A and mold face 12B is separated from plate 10B by an asbestos sheet 13B. Each of the mold faces 12A and 12B contains a half of a cavity 21, and which cavity 21 is the shape of the finished form as will now be understood. Each of the mold faces 12A and 12B has one-half of a vent 23 extending from the top of cavity 21 to the top of the mold faces. Heating elements 11 and 14 are coupled to individual temperature controls suspended from bed frame 2.

OPERATION

In utilizing the apparatus of the invention as heretofore described with reference to FIGS. 1, 2 and 3, the surface of the substrate to be processed is first prepared. This is accomplished by chemical etching in the case of metals, mechanical removal of the substrate surface in the case of thermoplastic materials and washing with a suitable solvent in the case of fabrics.

Mold faces 12A and 12B and bumper 81 are preheated and controlled individually or as a unit to a temperature corresponding to the point of flow of the form material, and which temperature may be, for purposes of illustration, 450° F.

A strip of raw molding material is placed over or into the area prepared on the substrate. The substrate is now placed on bed 6 with the prepared area centered over bumper 81. Alternately, as in the case of intermittent shapes across the width of the substrate, the molding material can be loaded directly into the cavities in the mold faces. Adjustable plates 83 and 85 cooperate with bumper 81 to contain overflow at the bate of mold faces 12A and 12B. Bumper 81 is ⅛ inch wider at each edge than the prepared substrate area. Bumper 81 is also ⅛ inch thicker than the channel within which it is contained. When in position, the base of mold 12 overlays by ⅛ inch the edge of each side of the prepared substrate area to contain the downward pressure.

With the substrate so prepared and in position, or with the molding material in the cavities, valve 54 is operated and frame 8 lowered to sit on the substrate surface, with the molding material being automatically in the proper area. Valve 40 is operated closing mold faces 12A and 12B. Valve 36 is coupled to valve 30 in a locked open position and valve 30 is operated causing pressure plate 9 to be displaced to exert pressure on the mold and whereupon pressure is exerted on back-up plate 20 and transferred to the center of the mold. Pressure and curing time are determined, as is temperature, in accordance with the materials involved.

Upon completion of the curing cycle the operation is reversed. Valve 30 is operated causing pressure plate 9 and back-up plate 20 to rise. Valve 40 is operated to open mold 12 and valve 54 is operated to raise frame 8. The substrate with the forms applied thereto is removed from the mold and processed for completion.

It will now be understood by those skilled in the art that various changes in the form and arrangements of the parts may be made without departing from the spirit and scope of the invention. For example, the forms may be applied at any given interval, fixed or otherwise, with ease of adaptability in respect to change of centers, length and form. The form material may be loaded on the prepared substrate area as heretofore noted for a continuous form across the substrate or, in the case of intermittent forms across the substrate, the closed mold may be loaded. In the case of simple continuous vertical forms across the substrate, form height is regulated by inserting spacers between the mold faces. The spacers have grooves on one side thereof for venting at each end of the mold. In this case, valves 30 and 36 are not interconnecting and plate 20 is operated independent of plate 9, with plate 20 compressing the spacer downward on the raw material to attain the predetermined form height. The material flow at the ends of the substrate is controlled by bumper 81.

The mold material may be in the form of preshaped parts in the raw, semi-cured or fully-cured state or as slugs of raw material, and the substrate may be flexible or rigid. Venting is enhanced since it is accomplished through the center of the two halves of the mold and cleaning of vents occurs automatically when the mold faces are parted preventing blocking of the vents.

With the above in mind, reference is to be had to the appended claims for a definition of the limits of the invention.

What is claimed is:

1. Apparatus for applying forms to substrates, comprising:
   a base
   a bed mounted to the base for supporting the substrate;
   a frame initially in a raised position above the bed and mounted for being raised and lowered relative thereto;
   a split mold having a pair of faces disposed laterally apart from each other so that the mold is open and supported by the frame for moving therewith, said faces each carrying a part of a mold cavity arranged for lateral displacement relative to each other, and heating means arranged in the mold faces for heating the mold;

a pressure plate initially in a raised position above the mold and supported by the frame for moving therewith, and longitudinally displaceable relative to the mold;

a back-up plate centered in the pressure plate in alignment with the center of the mold and supported for moving with the pressure plate;

means for lowering the frame to the bed so that the open mold surrounds a prepared area of the substrate and a load of form material disposed thereon, and heating means arranged in the bed for heating the prepared area of the substrate, said mold faces being out of contact with the mold;

means for laterally displacing the mold faces toward each other for closing the mold about the load on the substrate to form the cavity, said cavity contacting the load;

means for longitudinally displacing the pressure plate to exert pressure on the mold faces; and means for exerting downward pressure on the back-up plate centered in the pressure plate, with said downward pressure being transferred to the center of the closed mold.

2. Apparatus as described by claim 1, wherein the bed includes:

a pair of plates having parallel ends disposed for forming a channel, and said plates being adjustable for aligning the center of the channel with the center of the mold; and a resilient member positioned within the channel for supporting the substrate and load so that the pressure on the mold provided by the pressure plate and back-up plate is transferred to a predetermined area of the substrate defined by the resilient member.

3. Apparatus as described by claim 2, including:
heater means arranged in the bed for hating the resilient member.

4. Apparatus for applying forms to a substrate comprising:

a base;

a bed mounted to the base for supporting the substrate and a load of form material disposed on a prepared area thereof;

a frame pivotally mounted to the base and initially above the bed, said frame carrying an open, split mold sandwiched between a pair of laterally displaceable mold back-up plates said mold having a pair of faces each of which carries a part of a mold cavity, a pressure plate mounted for movement with the frame and longitudinally displaceable relative to the mold and a back-up plate centered within the pressure plate in alignment with the center of the mold and arranged for movement with the pressure plate;

means for pivoting the frame to carry the mold to the prepared area of the substrate, said mold being out of contact with the load;

means for laterally displacing the mold back-up plates to close the mold for forming the cavity about the load on the prepared substrate area;

means for longitudinally displacing the pressure plate to exert pressure on the mold back-up plates; and means for exerting pressure on the back-up plate within the pressure plate, with said pressure being transferred to the center of the mold.

5. Apparatus as described by claim 4, including:
means for relieving pressure on the back-up plate within the pressure plate;

means for longitudinally displacing the pressure plate to relieve pressure on the mold back-up plates;

means for laterally displacing the back-up plates to open the mold; and means for pivoting the frame to carry the mold away from the substrate.

6. Apparatus as described by claim 5, wherein:
the mold forms at least one cavity when the mold is closed and which cavity is the shape of the form to be applied; and at least one vent aperture extending substantially vertically from the cavity to the exterior surface of the mold.

References Cited
UNITED STATES PATENTS

| | | | |
|---|---|---|---|
| 2,791,265 | 5/1957 | Rolaston | 156—251 X |
| 3,347,733 | 10/1967 | Elver | 156—515 |
| 3,053,960 | 9/1962 | Spieles | 156—515 X |
| 3,432,374 | 3/1969 | Packard et al. | 156—581 |

BENJAMIN A. BORCHELT, Primary Examiner

J. V. DORAMUS, Assistant Examiner

U.S. Cl. X.R.

156—581, 583